(12) United States Patent
Opitz et al.

(10) Patent No.: US 8,128,253 B2
(45) Date of Patent: Mar. 6, 2012

(54) LIGHT EMITTING FLOOR SURFACE

(75) Inventors: Joachim Opitz, Aachen (DE); Stefan Peter Grabowski, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 259 days.

(21) Appl. No.: 12/524,385

(22) PCT Filed: Jan. 25, 2008

(86) PCT No.: PCT/IB2008/050266
§ 371 (c)(1),
(2), (4) Date: Jul. 24, 2009

(87) PCT Pub. No.: WO2008/093267
PCT Pub. Date: Aug. 7, 2008

(65) Prior Publication Data
US 2010/0103695 A1    Apr. 29, 2010

(30) Foreign Application Priority Data

Jan. 30, 2007 (EP) .................................. 07101416
Jan. 30, 2007 (EP) .................................. 07101418
May 16, 2007 (EP) .................................. 07108354

(51) Int. Cl.
*E01F 9/00* (2006.01)

(52) U.S. Cl. ......... 362/153; 362/145; 362/602; 362/610
(58) Field of Classification Search .................. 362/145, 362/153, 153.1, 601, 602, 608, 610, 612, 362/617, 619; 52/306, 308; 404/22, 23, 404/24
See application file for complete search history.

(56) References Cited

U.S. PATENT DOCUMENTS

| 3,996,556 | A   | * | 12/1976 | Eigenmann ................ 362/153.1 |
| 5,375,043 | A   | * | 12/1994 | Tokunaga ...................... 362/601 |
| 6,732,478 | B1  | * | 5/2004  | Russell et al. .................. 52/306 |
| 7,198,379 | B2  | * | 4/2007  | Ishibashi ....................... 362/612 |
| 7,481,562 | B2  | * | 1/2009  | Chua et al. .................... 362/612 |
| 2001/0036072 | A1 |  | 11/2001 | Baker |
| 2003/0174490 | A1 | * | 9/2003 | Allinson ......................... 362/31 |
| 2004/0240230 | A1 | * | 12/2004 | Kitajima et al. .............. 362/153 |

FOREIGN PATENT DOCUMENTS

| DE | 4339274 A1     | 5/1995 |
| DE | 20102832 U1    | 6/2001 |
| DE | 10013496 A1    | 10/2001 |
| DE | 10128689 A1    | 7/2002 |
| DE | 20306856 U1    | 4/2004 |
| DE | 20303610 U1    | 8/2004 |
| DE | 10347424 A1    | 5/2005 |
| DE | 202005013299 U1 | 6/2006 |
| JP | 63307406 A     | 12/1988 |
| WO | 02101284 A1    | 12/2002 |
| WO | 2006131924 A2  | 12/2006 |

* cited by examiner

*Primary Examiner* — Y My Qauch Lee
(74) *Attorney, Agent, or Firm* — John F. Salazar; Mark L. Beloborodov

(57) ABSTRACT

The invention relates to a light emitting system (1) for surfaces (2) of floor bottoms, walls or similar surfaces (2) of buildings for indoor or outdoor applications, in particular walkable or drivable surfaces (2), whereas the system comprises a laminar and plane base floor material (3) for flooring the surface (2), featuring a top surface (4) characterized in that on said top surface (4) of said base floor material (3) is layered a light guiding structure (5) for propagating light, which is coupled into said structure (5), whereas said structure (5) features an emission surface (6), arranged coplanar to the top surface (4) of said base floor material (3) for emitting the light.

7 Claims, 1 Drawing Sheet

LIGHT EMITTING FLOOR SURFACE

FIELD OF THE INVENTION

The present invention relates to a light emitting system for surfaces of floor bottoms, walls or similar surfaces of buildings for indoor or outdoor applications, in particular walkable or driveable surfaces, whereas the system comprises a laminar and plane base floor material for flooring the surface.

BACKGROUND OF THE INVENTION

Light emitting systems, which are arranged on bottoms, walls or on step surfaces of stairs for indoor or outdoor use are already well known. These illumination systems, which are provided for emitting light in different colours, usually comprise a housing or a box, in which the light sources like LEDs or OLEDs are arranged. By passing a translucent raft-up surface a homogeneous and uniform emitting of the light, emitted by the light sources, is achievable.

A light emitting system is disclosed in DE 101 28 689 A1. This system is applicable for floor bottoms featuring walkable or driveable surfaces, whereas the surface of the system comprises a glass screen. The glass screen is embodied as the top side of the housing, whereas within the housing the light sources and the electrical power supply are integrated. These housings, which are performed as cases or boxes, may be integrated into the bottom or the wall structure. Thus, the emission of light is limited to the emission surface of the cases or boxes. A planar light emission within the entire surface of the bottom is unfortunately not possible.

In the document WO 2006/131924 A2 is disclosed a light emitting system, comprising multiple light emitting sources embedded in a waveguide material, which is capable of propagating light generated by said light emitting sources, such that at least a portion of the light is diffused within the waveguide material and exits through an emitting surface. This light emitting system is applicable for liquid crystal displays, portable computer systems, computer monitors, personal digital assistants, cellular communication systems or television systems. The light emitting systems comprise one or more light emitting sources, which are embedded in a waveguide material having a first surface and a coplanar second surface, whereas the material features a laminar and plane extension. Said system needs a laminar and plane distribution of a plurality of light sources, which have to be power supplied, whereas the light emitting system features a thickness of at least a few mm or cm. Thus, the light emitting system is not suitable for plane and laminar base floor materials, for bottoms or walls, which are applied in buildings for indoor or outdoor use.

Another light emitting system is disclosed in document DE 100 13 496 A1. In this document a light emitting system in the shape of a bottom or wall covering, featuring a ceramic, wood, linoleum, or a plastic material is disclosed. These surfaces are designed as tiles, wherein within said tiles insertion elements may be applied. These insertion elements are performed as said light emitting systems, which are connected with a light source via waveguide fibres. The waveguide fibres are arranged between said tiles of said material and the wall or the bottom itself. Thus, a plurality of patterns with a specified optical appearance is achievable, but unfortunately a planar emission of light within the entire surface of the bottom or the wall is impossible.

SUMMARY OF THE INVENTION

Thus, the invention has the objective to eliminate the above mentioned disadvantages. In particular it is an objective of the present invention to provide a light emitting system that can be integrated into planar covers of bottoms, walls or similar surfaces featuring emission of light of desired colour in preselected areas.

This objective is achieved by a light emitting system as taught in the claims of the present invention. Preferred embodiments of the invention are defined by the subclaims.

The invention discloses that on said top surface of said base floor material a light guiding structure is layered for propagating light, which is coupled into said structure, whereas said structure features an emission surface, arranged coplanar to the top surface of said base floor material for emitting the light. Luminescent particles can be integrated into said light guiding structure to convert the light to almost any desired colour and to enhance light outcoupling out of said light guiding structure by scattering.

The light guiding structure is suitable to distribute coloured or white light within at least particulate areas across the bottom floor material, which is layered on the base floor or the wall. The light is able to propagate within the light guiding structure, whereas at least a portion of the light is diffused within the light guiding structure and exits through the emission surface, which is arranged coplanar to the opposite of the top surface of said base floor material. In its preferred embodiment the base floor material comprises a linoleum material, whereas the light guiding structure may be glued to the linoleum material.

Applications for the invented system are decorative illuminations or atmosphere creations with light for rooms or outdoor areas. In particular the light guiding structure may be manufactured in combination with a linoleum material, whereas both combined materials may be deposited on the bottom of the floor in the shape of one single bottom covering or flooring material, because the materials are glued together before it is laid out.

Light emission through the emission surface takes place at selected areas, whereas an emission within discrete, particular areas of the flooring is even possible. The particulate emission of light within the surface may be realized by laminating the base floor material with the light guiding structure in required areas for light emitting. Thus, different patterns or marks are applicable on the bottom surface.

As a preferred embodiment onto said emission surface a transparent protection layer is layered, in order to obtain an indelible and wear-resistant surface area of the system. The protection layer is transparent for the emitted light, and does not affect the light emission. The layer may be coated by brushing or spraying or may be performed as a foil, which is glued to the emission surface. The top surface of the transparent protection layer forms the surface area, which is walkable or driveable and features a high indelible and wear-resistant surface. Thus, the light guiding structure is not embodied as the top material of the bottom system, and is located underneath the protection layer.

According to another preferred embodiment the light guiding structure is limited in lateral direction by at least one edge, whereas the light is coupled into the structure at said edge by at least on light source, arranged adjacent to a wall or a baseboard. Adjacent to said wall or to said baseboard a holder unit for containing the light source is arranged, whereas the light source is connected to said light guiding structure by a light conducting element, by a snap-in system between the light source and the adapted edge or by gluing. By this system the light may be coupled into the light guiding structure via the edges or boarders. These edges or boarders are arranged adjacent to walls or baseboards of doors and are not visible, because they can be arranged behind a wash-board.

When the light emitting system is laid out across the floor said holder units containing the light sources are mounted adjacent to the baseboards by screws, nails or by gluing, whereas the light sources are performed as LEDs, OLEDs or light bulbs. These light sources may emit light in different colours like white or blue colour. Within the holder unit a receiving structure for receiving the light emitting system is provided, which may receive said light guiding structure. The light guiding structure may stand out of the edge of the bottom flooring, and may extend into the holder unit.

The connection between the light source and the light guiding structure may comprise a light conducting element, which also may feature a mechanical coupling next to the optical coupling, whereas a snap-in coupling is also applicable. The light source, which is performed as a LED, may be contained within the light conducting element, in order to provide an optimised in-coupling of the emitted light into the structure. Likewise a gluing is possible, whereas the glue material features a high transparency with respect to the emitted wavelength of the light sources.

If the light conducting elements are applied between the light source and the light guiding structure, the in-coupling of the light is performed punctual in selective steps. If a laminar light in-coupling is required, the light of the LEDs have to be diffused within a separate light guiding structure, which is deposited within the holder unit. By this structure the light is homogenised, before it is coupled into the light guiding structure for light emitting, which is placed on the top surface of the floor material.

The light propagating structure for homogenising the light features an extension parallel to the extension of the holder unit. In this case the light in coupling into the light guiding structure is realized by an extensive gluing over the entire surface. When the light sources are arranged adjacent to a wall or a baseboard within a room of a building, the power supply of the light sources is simplified, and the transportation of the power supply into the area of the light emitting structure is not essential. The arrangement of the light sources within the holder unit is applicable at only one border of the floor, whereas the light in-coupling may happen at more than one boarder, for example at the left and the right side of a floor with a longitudinal extension.

Advantageously, the light guiding structure comprises nano-phosphors, quantum dots, emitting molecules or emitting ions for optical excitation and light emission, whereas at least one transparent or translucent material is arranged on said emission surface by an additional layering or is integrated in the material of said light guiding structure. Thus, light with a first wavelength may be absorbed and emitted by the emission surface with a second wavelength. If the in-coupled light by the light sources features a wavelength of blue light (465 nm) or near UV-light (395 nm), the emission surface of the light guiding structure may be coated with transparent or translucent substances, which emit light within the visible range.

If the emitter materials are applied within the material of the light guiding structure, these emitter materials have to be of very small sizes within the nm-range. These nano-phosphor materials may be performed as $LaPO_4:Tb$, $YVO_4:Eu$ (10 nm-300 nm) or as quantum dots like ZnS, CdSe (<20 nm). The fluorescent molecules may be performed as Eu-complex compounds, whereas organic molecules like Lumogen-materials are suitable likewise.

According to another preferred embodiment of the present invention the light guiding structure comprises a glass material or a transparent synthetic material, whereas said light guiding structure comprises a homogeneous and uniform material system or a system of light fibres or light conducting elements, embedded in said light guiding structure, whereas said light guiding structure covers the entire floor material or covers discrete areas of said floor material. The glass material may be a silica-glass or a mineral-glass, whereas if the light guiding structure is performed as a synthetic material a plastic material like polystyrole (PS), polymethyl-methacrylate (PMMA), polyethylen-terephthalate (PET), polycarbonate (PC) or polyurethane (PU) are suitable materials.

The light guiding structure may be performed as one homogeneous and uniform single material system or may contain light fibres or light conducting elements, which are embedded in a carrier material. If the light guiding structure comprises light fibres, these light fibres comprise at least one of said emitter materials.

Yet another embodiment of the present invention may be seen in arranging said light fibres or light conducting elements within said light guiding structure, whereas these elements or fibres comprise a homogeneous refraction index, a graded index or a step index.

The light is coupled into the material system at discrete and single areas. Within these areas, the brightness of the light is very high compared to the areas in between the in-coupling areas. The light is diffused within the waveguide material and exits through at least a portion of the emitter surface. Thus, the brightness of the emitted light within the entire surface of the material system is not homogeneous, if the refraction index is homogeneous. According to another preferred embodiment, said emission surface is structured or performed as a rough-up surface, in order to provide a homogeneous emission of said light. Thus, the roughness of the surface of the emitter materials may comprise a gradient refraction index.

The light guiding structure may comprise said nano-phosphor or quantum dots within the wave guiding fibre, whereas the light out coupling happens by a rough up surface of the waveguide fibres. This leads to a scattering effect of the emitted light, whereas the conical-shaped patterns within the bottom floor appear in the emission color of the LED-light sources. If nano-phosphor or quantum dots are integrated in the glass fiber, the light emission happens within the emission wavelength of the emitter materials. If glass fibres are applied, in order to create a scattering of the light, the emission of the light corresponds to the emitted wavelength of the LED.

Another embodiment of the present invention comprises a wave guiding structure with wave guiding elements featuring a width of a few cm. By the application of wave guiding elements with a width of a few cm the visibility of the emitting structure is increased, because the light emission is not punctual, but happens by way of extended areas. This embodiment is suitable for pathways and marks on the bottom or on the walls.

BRIEF DESCRIPTION OF THE DRAWINGS

Additional details, characteristics and advantages of the objective of the invention are disclosed in the depending claims and the following description of the respective FIGURE—which are only shown in an exemplary fashion—show preferred embodiments of the invention, which will be described in conjunction with a single accompanying FIGURE, in which the:

DETAILED DESCRIPTION OF EMBODIMENTS

Figure 1:
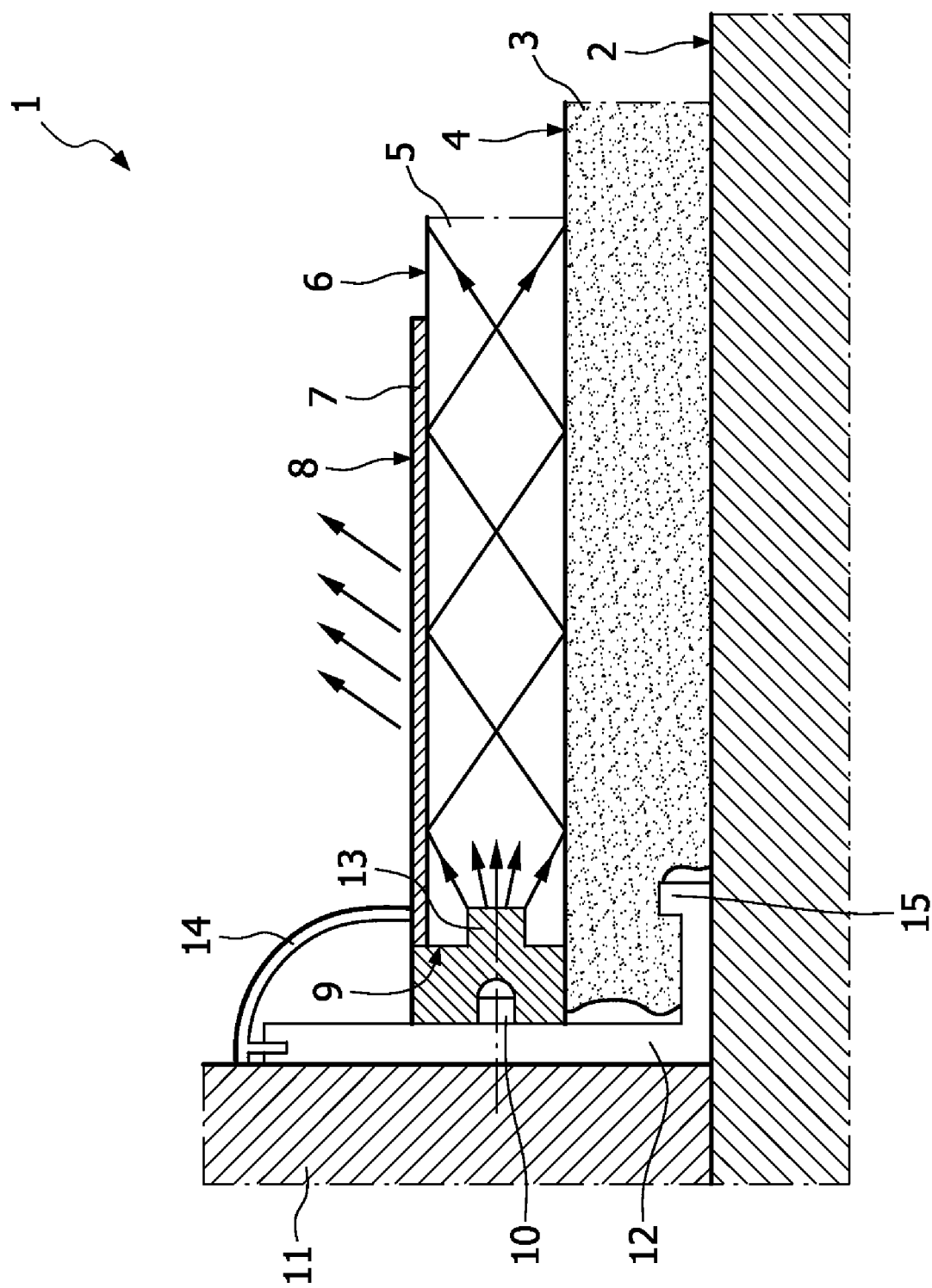
FIG. 1 shows a cross-section of the light emitting system in a schematic view.

In the FIG. 1 is shown a light emitting system 1, which is applicable on surface 2 of floor bottoms, walls or similar surfaces of buildings for indoor and outdoor applications. The surface 2 may be in particular walkable or drivable, and may be a circulation space within a building, a garage or similar. Onto the surface 2 is applied a laminar and plane base floor material 3 for flooring the surface 2, whereas the base floor material 3 comprises a linoleum material. On the top surface 4 of said base floor material 3 is layered a light guiding structure 5 for propagating light, which is coupled into said structure 5 by a light source 10. The light guiding structure 5 comprises an emission surface 6, in order to emit the in-coupled light into the top direction in a homogenous way, as shown by arrows above the emission surface 6.

In order to protect the light guiding structure 5, a transparent protection layer 7 is applied on the emission surface 6 of the structure 5. This transparent protection layer 7 is brushed or sprayed as a finishing layer onto the light emitting system 1 and features a high indelible and wear-resistant surface area 8.

The light emitting system 1 is shown adjacent to a wall 11, in order to figure the light in-coupling system. The light source 10 is contained within a holder unit 12, which shows an L-shaped-profile and is arranged in a longitudinal extension along the wall 11. The holder unit 12 features a clamping shape 15, in order to retain the base floor material 3. In the vertical section of the holder unit 12 the light source 10 is arranged and is covered by a connection element 13, which provides an optical connection between the light source 10 and the material of the light guiding structure 5. Thus, the light, emitted by the light source 10, is guided to the edge 9 into the light guiding structure 5.

The behaviour of the light, comprising a total reflection at the top and bottom interface, is shown by different arrows. Only a portion of the light guided through the structure 5, is emitted via the emission surface 6. Between the transparent protection layer 7 and the wall 11 a wash-board 14 is shown, in order to cover the light in coupling system, comprising the holder unit 12 and the light source 10 and the connection element 13. The relation between the thickness of the base floor material 3 and the light guiding structure 5 or the protection layer 7 is only shown in an exemplary fashion and is not to be interpreted as a limitation of the present invention.

The present invention is not limited by the embodiment described above, which is represented as an example only and can be modified in various ways within the scope of protection defined by the appending patent claims. Thus, the invention is also applicable to different embodiments, in particular of the design of any surface of objects like furniture, equipment or installations.

LIST OF NUMERALS 1 light emitting system
2 bottom surface
3 base floor material
4 top surface
5 light guiding structure
6 emission surface
7 transparent protection layer
8 surface area
9 edge
10 light source
11 wall
12 holder unit
13 connection element
14 wash-board
15 clamping shape

The invention claimed is:

1. A light emitting system for walkable or drivable surfaces, the system comprising
a base floor material having a top surface,
a light guiding structure layered on said top surface of said base floor material for propagating light coupled into said structure, said structure having an emission surface, arranged adjacent to said top surface of said base floor material for emitting the light, said light guiding structure being limited in lateral direction by at least one edge, wherein the light is coupled into the light guiding structure at said edge by at least one light source, arranged adjacent to a wall or a baseboard;
an L-shaped holder unit disposed adjacent to said wall or to said baseboard for at least partially receiving said light source, wherein the light source is connected to said light guiding structure by a light conducting element;
said L-shaped holder unit receiving said floor material and retaining said floor material relative to said holder unit by a clamping structure and positioning said floor material below said light guiding structure;
wherein said light guiding structure has a transparent protection layer formed of a wear resistant surface adjacent said emission surface thereby allowing transmission of light emitted by said at least one light source through said transparent protection layer;
said L-shaped holder unit retaining said floor material adjacent the wall while allowing said floor material, said light guiding structure and said at least one light source to be integrated into a flooring surface and adjacent said wall.

2. A light emitting system according to claim 1, wherein the light guiding structure comprises nano-phosphors, quantum dots, emitting molecules or emitting ions for optical excitation and light emission, and wherein at least one transparent or translucent material is arranged on said emission surface by an additional layering or is integrated in the material of said light guiding structure.

3. A light emitting system according to claim 1, wherein the light guiding structure comprises a glass material or a transparent synthetic material.

4. A light emitting system according to claim 3, wherein the light guiding structure further comprises a plurality of light fibres or light conducting elements having a homogenous refraction index, a graded index or a step index, in order to provide a homogenous emission of said light within the light emitting system.

5. A light emitting system according to claim 1, wherein said emission surface is roughened in order to provide a homogenous emission of said light.

6. A light emitting system according to claim 1, further comprising selected from the group consisting of: LEDs, OLEDs or light bulbs, and which emit light of different wavelengths and which are programmable or controllable by a remote program or control system.

7. A light emitting system for flooring, comprising:
a floor material retained against a wall by an L-shaped holder, said L-shaped holder maintaining said floor material in position relative to a lighting guide structure by a clamping shape;
said L-shaped holder further retaining the lighting guide structure above said floor material and adjacent a plurality of light source retained within said L-shaped holder, said light sources emitting light into said lighting guide structure;

wherein said light guide structure includes an upper emission surface where light, emitted by said plurality of light sources, is emitted;

said L-shaped holder acting to retain both said floor material and said lighting guide structure in relative fixed position while also maintaining a relative position of said plurality of light sources relative to said lighting guide structure.

* * * * *